United States Patent
Wolf et al.

(10) Patent No.: US 8,566,512 B2
(45) Date of Patent: Oct. 22, 2013

(54) AUTOMATIC ALIGNMENT OF WRITE REQUESTS IN VIRTUALIZATION SYSTEMS

(75) Inventors: Kevin M. Wolf, Sachsenheim (DE); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 248 days.

(21) Appl. No.: 12/965,034

(22) Filed: Dec. 10, 2010

(65) Prior Publication Data

US 2012/0151115 A1    Jun. 14, 2012

(51) Int. Cl.
*G06F 12/00* (2006.01)

(52) U.S. Cl.
USPC ............ 711/103; 711/154; 711/170; 709/203

(58) Field of Classification Search
USPC ........................ 711/106, 154, 170; 709/203
See application file for complete search history.

(56) References Cited

U.S. PATENT DOCUMENTS 8,171,201 B1 * 5/2012 Edwards, Sr. ..................... 711/6
8,285,965 B2 * 10/2012 Karr et al. ..................... 711/173

OTHER PUBLICATIONS

"Disk Sector", printed from Internet: http://en.wikipedia.org/wiki/Disk_sector on Dec. 9, 2010, (Nov. 30, 2010), pp. 1-5.
"Master boot record", printed from Internet: http://en.wikipedia.org/wiki/Master_boot_record on Dec. 9, 2010, (Dec. 8, 2010), pp. 1-9.

* cited by examiner

*Primary Examiner* — Matthew Bradley
(74) *Attorney, Agent, or Firm* — Lowenstein Sandler LLP (57) ABSTRACT

A method and system for automatically aligning the location of a write request of a guest operating system (OS) to a storage boundary of a computer system that hosts the guest OS. The computer system detects an indication of misalignment between a partition of the guest OS and a storage boundary in data storage. In response to the indication, the computer system shifts the partition by a number of bytes to align a starting location of the partition to the storage boundary, and shift locations of subsequent data access requests of the guest OS by the same number of bytes.

20 Claims, 5 Drawing Sheets

AUTOMATIC ALIGNMENT OF WRITE REQUESTS IN VIRTUALIZATION SYSTEMS

TECHNICAL FIELD

Embodiments of the present invention relate to a computer system, and more specifically, to management of data access in a virtual machine system.

BACKGROUND

A sector is a subdivision of a track on a magnetic or optical hard disk drive (also referred to as "disk"). Each sector stores a fixed amount of data. Traditionally, each sector is formatted to store 512 bytes of data. With the advance of disk technology, a new standard has been widely adopted to store 4K bytes (i.e., 4096 bytes) in a sector.

Many older versions of operating systems still assume that disks are configured to have 512-byte sectors; e.g., Red Hat® enterprise Linux (RHEL®) version 4, Windows® XP, Windows® 2003, etc. These operating systems can issue a write command that records new data on the disk at a location not aligned to the sector boundary of a disk that uses the new standard. With these operating systems, writing even a single byte to a disk sector can cause the entire sector to be read and rewritten. For example, when writing to a part of a sector on a disk having 4K-byte sectors, an entire 4K-byte sector containing the targeted location is read out and modified by the new data. Then the entire 4K-byte is rewritten onto the disk. This operation, known as Read-Modify-Write (RMW), is costly and can result in significant degradation to disk performance.

To align write locations to the sector boundary, some newer versions of operating systems (e.g., RHEL® version 5, Windows® Vista, etc.) use multiple partition tables that have different layouts for different disks. In a virtualization system, a guest operating system (OS) uses a disk image and not a physical disk. The host OS usually knows what the right alignment for the disk image is, and can pass the information to the guest OS. The guest OS can then consult an appropriate partition table and use an appropriate disk layout in its write requests. However, this approach generally works with newer versions of guest operating systems. Older versions of guest operating systems are not aware of the misalignment problem and often issue write requests to locations that do not align with the disk sector boundaries.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for automatically aligning the location of a write request of a guest operating system (OS) to a storage boundary of a computer system that hosts the guest OS. In one embodiment, the computer system detects an indication of misalignment between a partition of the guest OS and a storage boundary in data storage. In response to the indication, the computer system shifts the partition by a number of bytes to align a starting location of the partition to the storage boundary, and shift locations of subsequent data access requests of the guest OS by the same number of bytes.

Embodiments of the present invention align a partition table to a sector boundary of new hardware transparently to a guest OS. Thus, a guest OS having an older OS version can have improved performance when accessing new hardware.

Embodiments of the present invention allow a guest OS, which was designed to access disks having a sector size of 512 bytes, to write to disks having a new sector size (e.g., 4096 bytes, referred to as "4K bytes") without misalignment problems. The guest OS may be an older version of an OS (e.g., RHEL® version 4, Windows® XP, Windows® 2003, etc.) that was developed before the 4K-byte sector was widely adopted. In a virtualization system, the guest OS is not aware of the misalignment problem caused by its write requests. In one embodiment, a hypervisor is able to detect misalignment of a guest partition and shift the partition such that the starting location of the partition aligns to the sector boundary of the disk. Thus, the write request issued from the guest OS can be aligned to the actual sector boundary of the disk.

Further, embodiments of the present invention not only align a guest partition to a sector boundary on a disk, but also align a guest partition to a block boundary of a file system used by the host computer system. Thus, the term "storage boundary" is used herein to mean a "sector boundary" of a physical disk, a "block boundary" in a file system, or other data boundaries in data storage. In one embodiment, the physical disks and the guest OS may both use a sector size of 512 bytes. However, the guest data may be stored in an image file on a file system that organizes data in 4K-byte blocks. In this embodiment, the starting location of the partition can be aligned to the block boundary of a file system used by the host computer system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
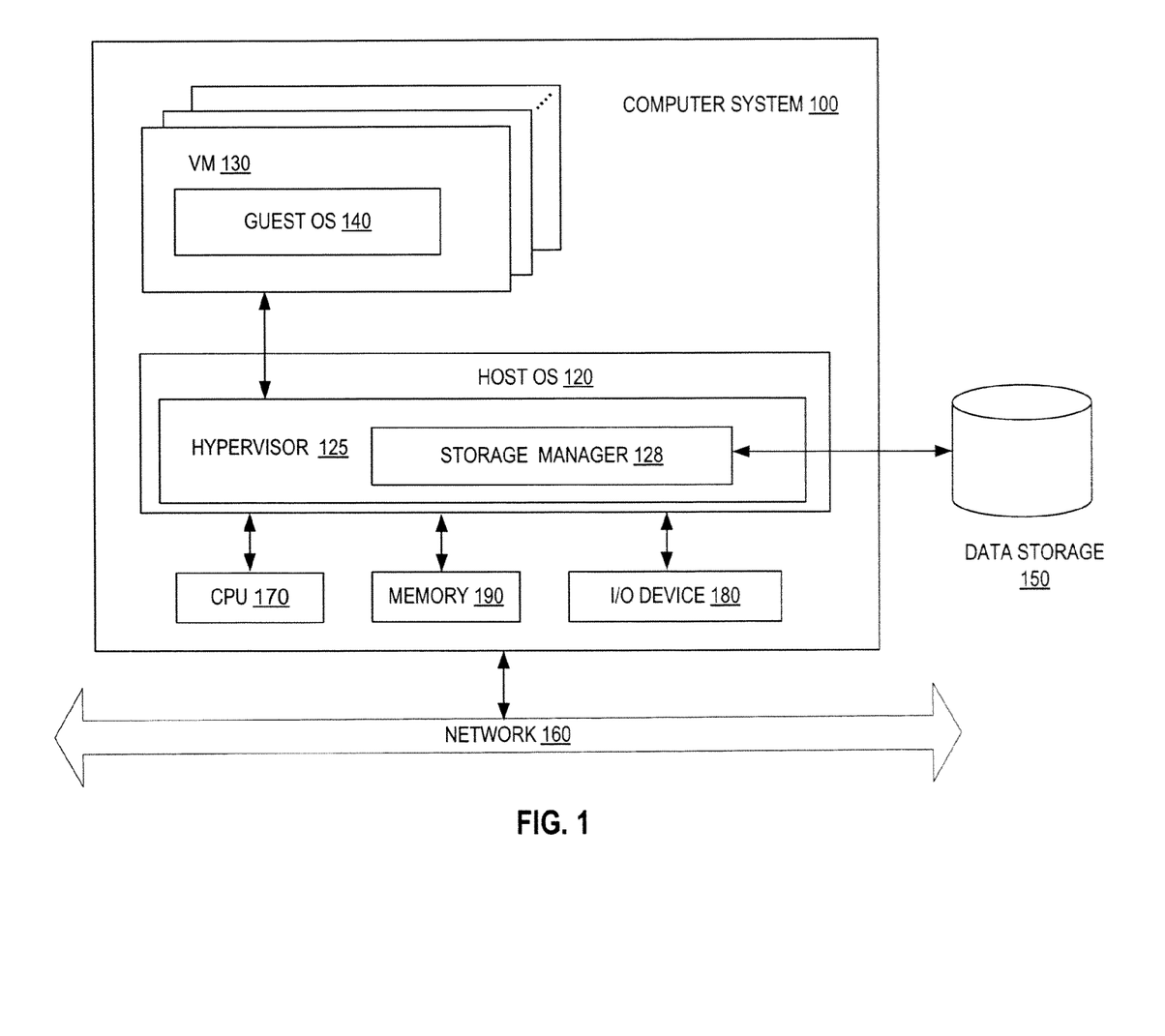
FIG. 1 is a block diagram of a virtual machine system in which embodiments of the present invention may operate.

FIG. 1 is a block diagram that illustrates an embodiment of a computer system 100 in which embodiments of the present invention may operate. The computer system 100 hosts a plurality of virtual machines (VM) 130. Each virtual machine 130 runs a guest operating system (OS) to manage its resources. The virtual machines 130 may run the same or different guest operating systems, such as Microsoft Windows®, Linux®, Solaris®, Mac® OS, RHEL®, etc.

The computer system 100 may be a server, a workstation, a personal computer (PC), a mobile phone, a palm-sized computing device, a personal digital assistant (PDA), etc. In one embodiment, some of the virtual machines 130 may run a guest OS 140, which uses a traditional sector size (i.e., 512 bytes) for disk access.

The computer system 100 also runs a host OS 120 to manage system resources. In one embodiment, the computer system 100 runs a hypervisor 125 to virtualize access to the underlying host hardware, making the use of the virtual machine 130 transparent to the guest OS 140 and the users of the computer system 100. The hypervisor 125 may also be known as a virtual machine monitor (VMM) or a kernelbased hypervisor. In some embodiments, the hypervisor 125 may be part of the host OS 120.

In one embodiment, the computer system 100 is accessible by remote systems via a network 160. The network 160 may be a private network (e.g., a local area network (LAN), a wide area network (WAN), intranet, etc.) or a public network (e.g., the Internet). The computer system 100 also includes hardware components such as one or more physical central processing units (CPUs) 170, memory 190, I/O devices 180 and other hardware components.

In one embodiment, the computer system 100 is coupled to a data storage 150, e.g., mass storage devices, such as magnetic or optical storage based disks, tapes, or hard drives. In one embodiment, the data storage 150 includes disks, each of which is partitioned into sectors having a sector size of a power of 2 bytes and greater than a sector size used by the guest OS 140.

For simplicity of the discussion, the sector size of the disks in data storage 150 is described in the following as 4K bytes. It is understood that the sector size of the disks in data storage 150 can be any number of bytes that is a power of 2 and greater than or equal to a sector size used by the guest OS 140. Additionally, the "traditional" sector size used by the guest OS 140 is described in the following as 512 bytes. It is also understood that the sector size of the guest OS 140 can be any number of bytes that is a power of 2 and smaller than or equal to a sector size of the disks.

According to one embodiment of the present invention, the hypervisor 125 includes a storage manager 128 to manage read and write requests of the guest OS 140. In one embodiment, the storage manager 128 is able to detect the sector size used by the guest OS 140, and adjust the write location of the guest OS 140 such that data can be written to a location that aligns to the sector boundary of the disks.

Figure 2:
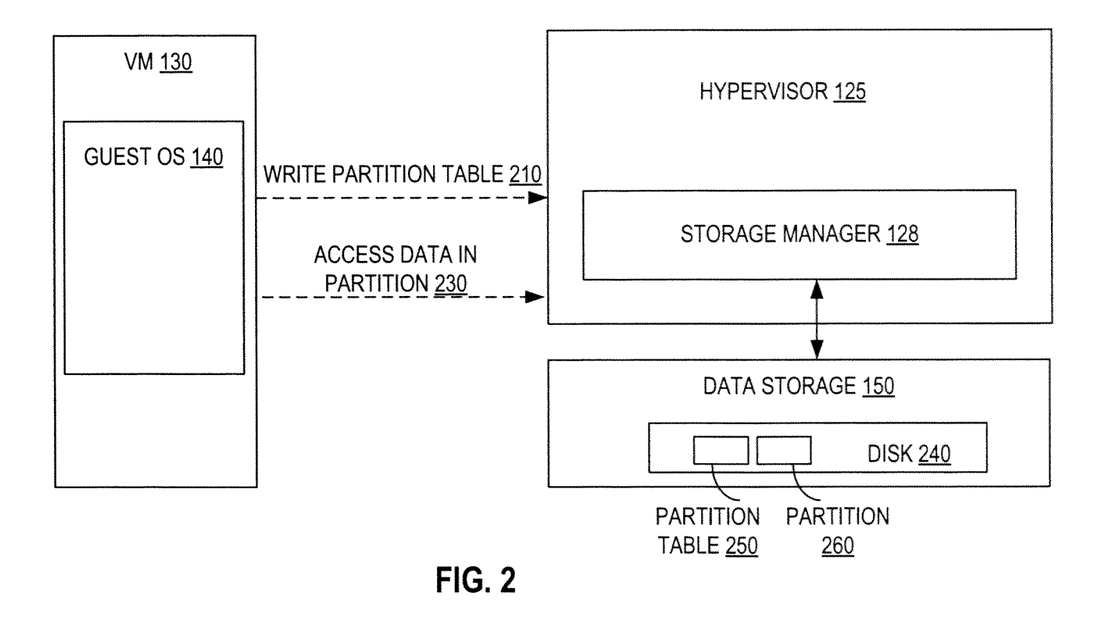
FIG. 2 illustrates an example of a guest operating system that sends write requests to a storage manager in a hypervisor.

FIG. 2 illustrates an example of the requests sent from the guest OS 140 to the hypervisor 125. In one embodiment, the guest OS 140 is allocated with a disk space on a disk 240 that has a sector size of 4K bytes. The allocated space is seen by the guest OS 140 as a disk image. To format the allocated disk space, the guest OS 140 starts with writing a partition table 250 to the disk 240 (message 210). The partition table 250 specifies the starting location (or "offset") of a partition 260 that the guest OS 140 is going to access on the disk 240. Typically, a guest OS that uses a traditional sector size of 512 bytes may start its first partition at a sector which does not begin at a 4K-byte sector boundary. For example, a guest OS that uses a traditional sector size of 512 bytes may start its first partition at sector 63 (i.e., the sector that has a starting location at 63×512 bytes from the beginning of the allocated disk space). Sector 63 does not begin at, nor align to, a 4K-byte sector boundary. Thus, the partition table 250 provides an indication of misalignment between a guest partition and a storage boundary (e.g., a sector boundary in a disk, a block boundary in a file system, or other data boundaries in data storage). This indication of misalignment is also an indication that the guest OS 140 uses a sector size smaller than the storage size (e.g., a sector size of a disk, a block size of a file system, etc.).

In one embodiment, the storage manager 128 analyzes the message 210 and determines that the message 210 is partition I/O. From the partition I/O, the storage manger 128 detects misalignment by checking the starting location of the first partition specified in the partition table 250. If it is detected that the starting location of the first partition does not align to a 4K-byte sector boundary on the disks 240, the storage manager 128 can shift the write locations of the guest OS 140 by 512 bytes, or an integer multiple thereof, such that the starting location of the first partition aligns with the 4K byte sector boundary. The shifting of the write locations applies to all write requests from the guest OS 140, including writes to the partition table 250 and a boot loader of the guest OS 140. The shifting, as well as the actual location to which data is written, is transparent to the guest OS 140. The entire first partition, the partition table 250 and the boot loader are shifted by the same number of bytes. The guest OS 140 may then request creation of a file system in the first partition that includes a hierarchy of data blocks. Each of the data blocks may have a size of 4K bytes or a multiple of 4K bytes. As the first partition on the disk 240 aligns to the 4K-byte sector boundary, each of the data blocks is also aligned to the 4K-byte sector boundary. As a result, when the guest OS 140 performs standard block requests to read from or write to any of the data blocks in the first partition (message 230), the locations accessed by the read and write requests are aligned to the 4K-byte sector boundary.

In one embodiment, the guest OS 140 may request to create additional partitions in the allocated disk space. As the size of the partitions is typically a multiple of 4K bytes, each of the additional partitions will start at a shifted location that aligns to the 4K-byte sector boundary. If any of the partitions has a size that is not a multiple of 4K bytes, the storage manager 128 can shift the starting location of that partition by an additional amount such that it starts at a location aligning to the 4K-byte sector boundary.

Figure 3:
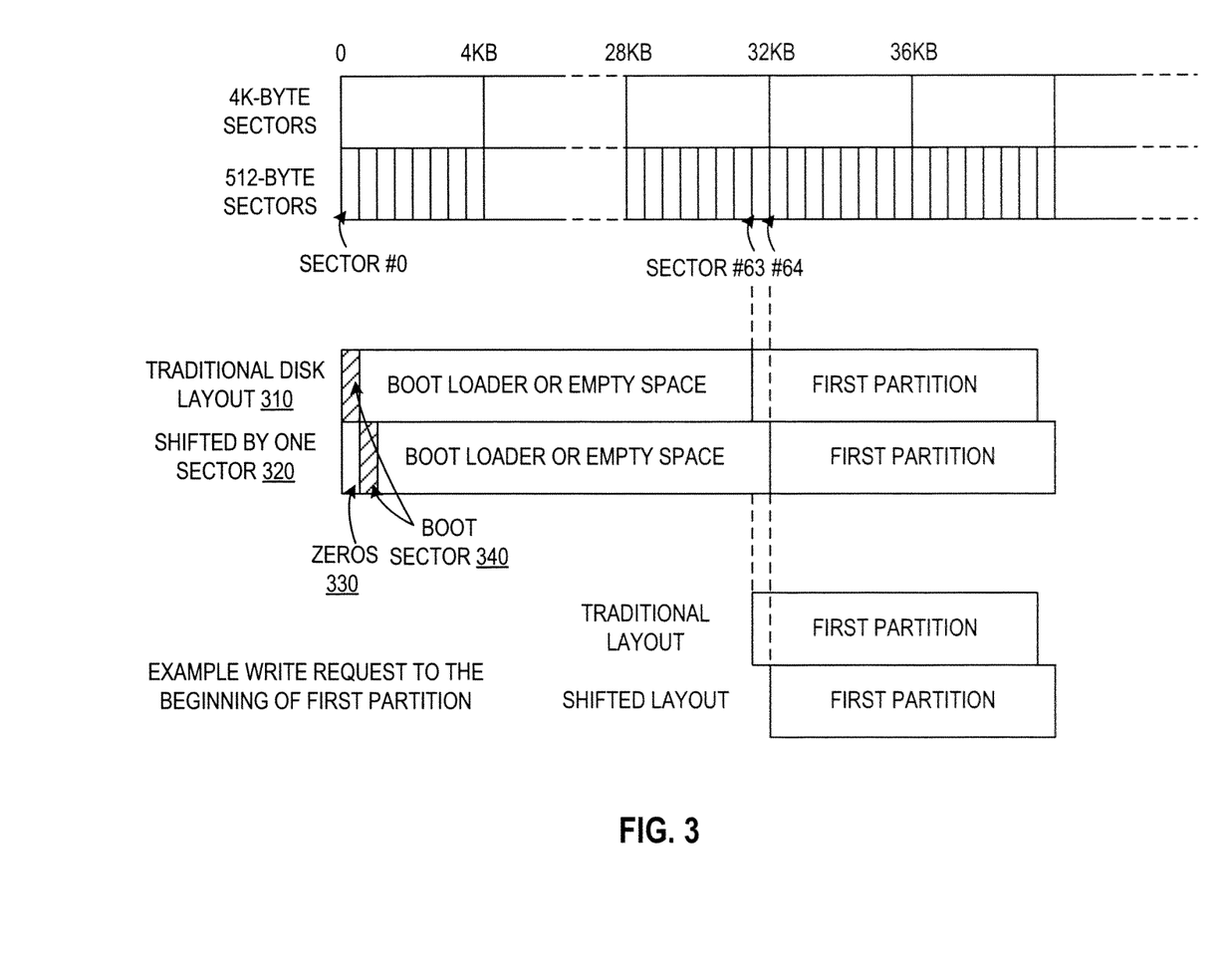
FIG. 3 illustrates an example of a shifted layout of a disk according to one embodiment of the present invention.

FIG. 3 is a diagram that illustrates an example of a layout 310 of a disk having 4K-byte sectors (e.g., the disk 240 of FIG. 2) in comparison with a layout 320 of a disk having 512-byte sectors (i.e., the traditional layout). As shown in FIG. 3, each 4K-byte sector occupies the same amount of space as eight 512-byte sectors. Typically, the beginning portion of the disk space allocated to the guest OS 140 stores a boot loader, with the first 512 bytes of the boot loader containing a boot sector 340. The boot sector 340 contains a master boot record, which contains a partition table of the guest OS 140. For example, the partition table may be stored in the boot sector 340 with an offset of 446 bytes from the beginning of the boot sector 340. If the partition table specifies that a first partition is to start at sector 63, the storage manager 128 will interpret this sector number as an indication that the guest 140 uses a traditional disk layout. The storage manager 128 then shifts all of the data that has been written so far (e.g., one or a few sectors) to the right (i.e., towards the direction of higher sector numbers), and starts filling zeros 330 in the space emptied by the shifting at the beginning of the disk space. The storage manager 128 also shifts the location of the first partition by 512 bytes to the right (i.e., towards the direction of higher sector numbers), such that that the first partition starts from a 4K-byte sector boundary (i.e., sector 64 in the 512-byte sectors). The storage manager 128 can leave the first 512 bytes (i.e., sector 0 in the 512-byte sectors) in the allocated disk space empty or fill it with zeros 330. The number of bytes filled with zeros 330 is the same as the number of bytes that the first partition is shifted. That is, if the starting location of the first partition is shifted by N bytes towards the direction of higher sector numbers, the storage manager 128 can write zeros to the initial N bytes of the disk space allocated to the guest OS 140. Thus, in this scenario, the entire disk space accessible by the guest OS 140, including the boot loader, the partition table, and the first partition, will be shifted by N bytes.

In some scenarios, the partition table of the guest OS 140 may specify that the first partition starts from a location aligned to the 4K-byte sector boundary. In these scenarios, no shifting is necessary. If it takes more than 512 bytes shift to align the starting location of the first partition with the 4K-byte sector boundary, the storage manager 128 will determine the necessary shift amount, and shift the first partition accordingly. After the first partition is shifted, the storage manager 128 will shift the access locations for all subsequent read and write requests from the guest OS 128 by the same number of bytes as it shifts the first partition.

Figure 4:
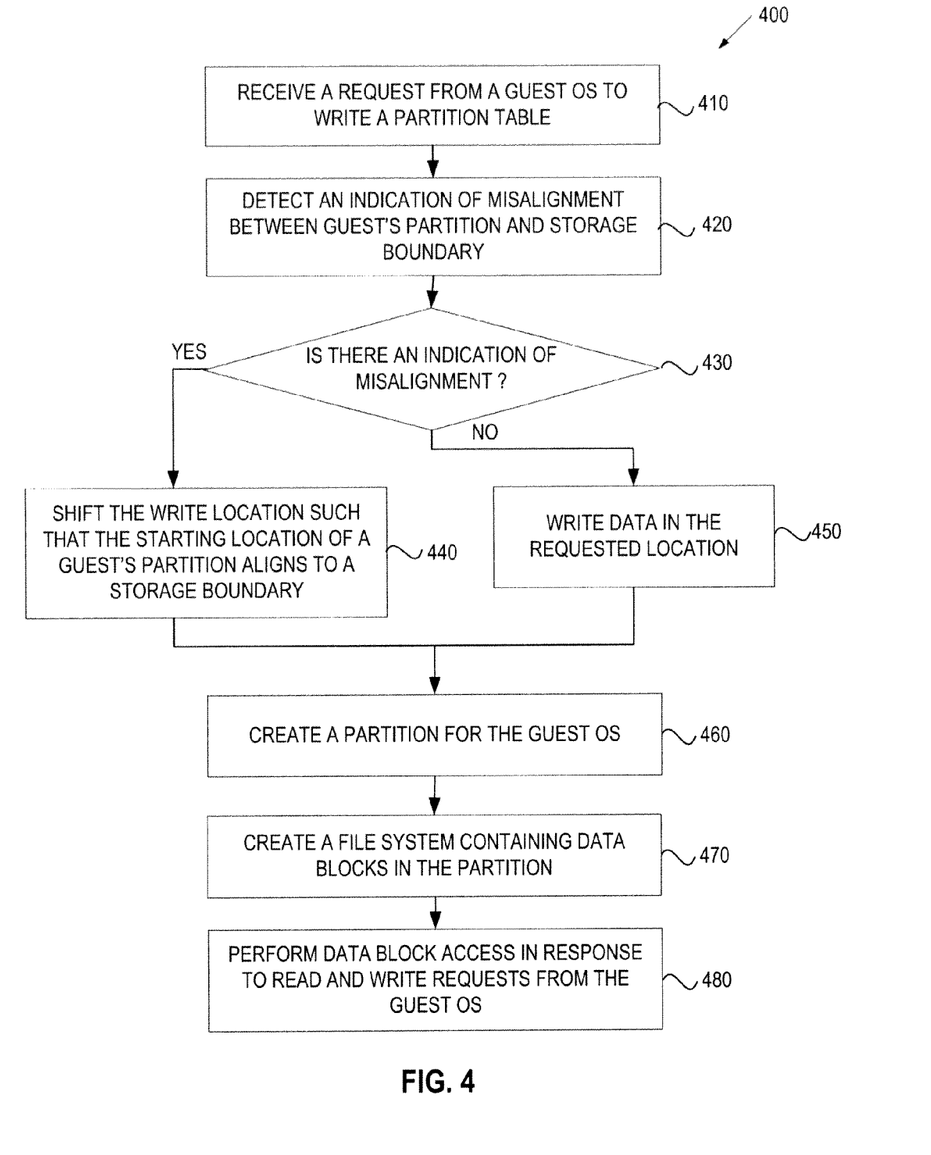
FIG. 4 is a flow diagram of one embodiment of a method for automatic aligning the location of a write request of a guest operating system to a storage boundary of a computer system.

FIG. 4 is a flow diagram illustrating one embodiment of a method 400 for automatic aligning the location of a write request to a storage boundary of a computer system. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the storage manager 128 in the hypervisor 125 of FIG. 1 and FIG. 2.

Referring to FIG. 4, in one embodiment, the method 400 begins when the storage manager 128 receives a request from the guest OS 140 to write a partition table on a disk (e.g., the disk 240 of FIG. 2) (block 410). The disk may have a sector size of 4K bytes or a multiple of 4K bytes. The partition table indicates the starting location of the partition used by the guest OS 140. In one embodiment, the storage manager 128 automatically detects an indication of misalignment between the partition and a storage boundary in data storage of the computer system from the partition table (block 420). The storage manager 128 checks the starting location of the partition specified in the partition table to determine whether the partition aligns to the storage boundary. If the starting location does not align to the storage boundary of the disk, the storage manager 128 determines that misalignment exists (block 430). In an alternative embodiment, the indication of misalignment may be provided by a user or a system administrator.

In response to an indication of misalignment, the storage manager 128 shifts the write locations on the disk; that is, the storage manager 128 shifts the location of the partition table and the boot loader on the disk such that the starting location of the partition can be aligned to the storage boundary (block 440). If the starting location of the partition specified in the partition table aligns to the storage boundary, the storage manager 128 determines that there is no misalignment (block 430). In response to this determination, the storage manager 128 writes data at the requested locations without shifting the write locations (block 450).

In one embodiment, the storage manager 128 creates a partition for the guest OS 140 (block 460), at a location that aligns to the sector boundary of the disk. The storage manager 128 may also receive a request from the guest OS 140 to create a file system containing multiple data blocks in the partition that has been created (block 470). The storage manager 128 creates the data blocks in the partition, with each data block aligning to the storage boundary. If the partition has been shifted, each of the data blocks will be shifted by the same number of bytes as the partition. After the file system is created, the guest OS 140 may send data access requests (read and/or write requests) to the storage manager 128 to access data on the disk. In response to the data access requests, the storage manager 128 performs data block access (block 480) to locations on the disk that align to the storage boundary.

Accordingly, all of the read and write requests from the guest OS 140 can align to the storage boundary, without the guest OS 140 knowing that the locations of its requests have been shifted.

Figure 5:
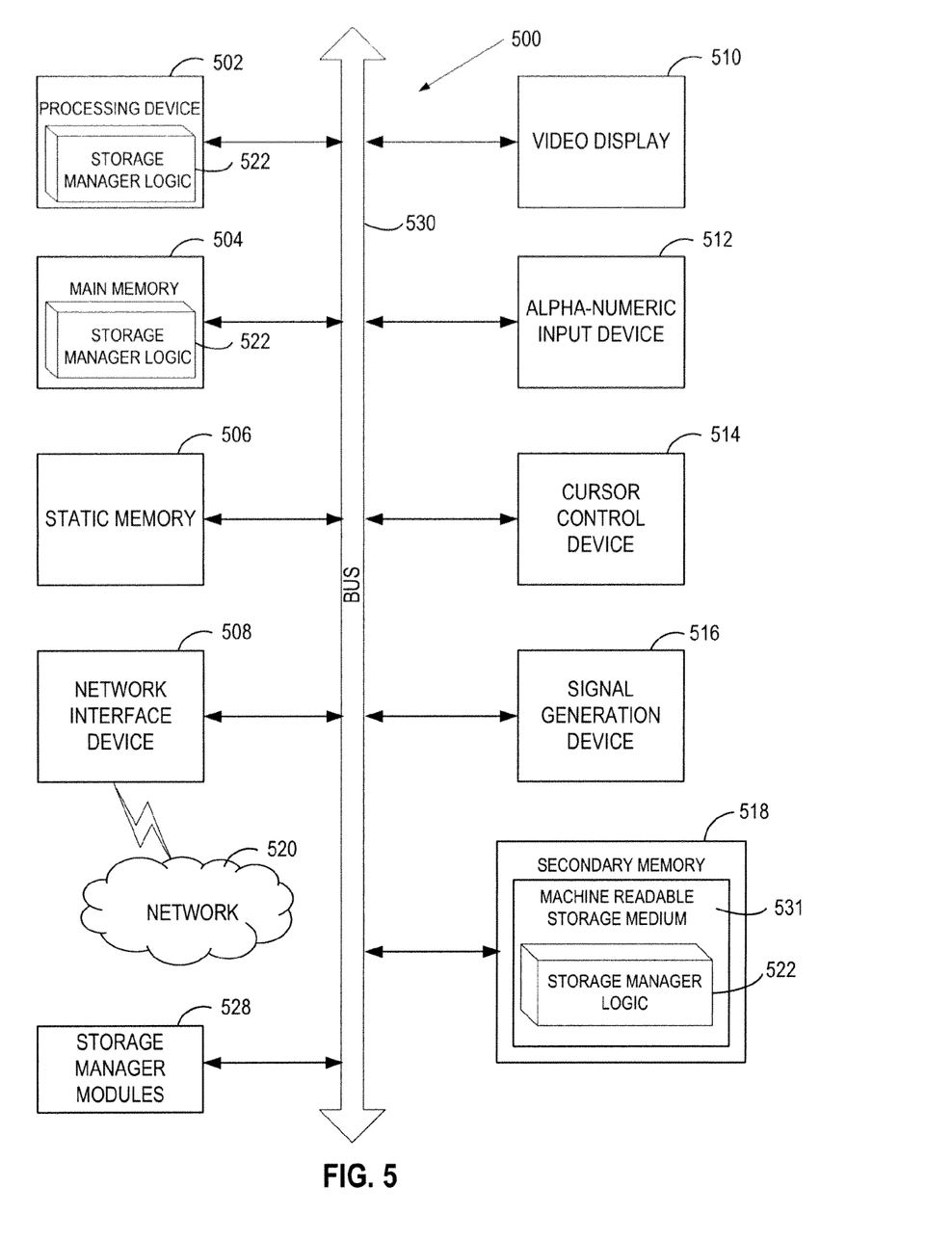
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the storage manager logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., the storage manager logic 522) embodying any one or more of the methodologies or functions described herein (e.g., the storage manager 128 and the hypervisor 125 of FIGS. 1 and 2). The storage manager logic 522 may also reside, completely or at least partially, within the main memory 504 and/or within the processing device 502 during execution thereof by the computer system 500; the main memory 504 and the processing device 502 also constituting machine-readable storage media. The storage manager logic 522 may further be transmitted or received over a network 520 via the network interface device 508.

The machine-readable storage medium 531 may also be used to store the storage manager logic 522 persistently. While the machine-readable storage medium 531 is shown in an exemplary embodiment to be a single medium, the team "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include storage manager modules 528 for implementing the functionalities of the storage manager 128 and the hypervisor 125 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "shifting", "receiving", "writing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer system may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system, comprising:
    receiving, by a hypervisor of the computer system, a request pertaining to a partition from a guest operating system;
    detecting, by the hypervisor, an indication of misalignment between the partition and a storage boundary in data storage of the computer system, the partition used by the guest operating system;
    in response to the indication, shifting, by the hypervisor, the partition by a number of bytes to align a starting location of the partition to the storage boundary of the computer system; and
    shifting, by the hypervisor, locations of subsequent data access requests of the guest operating system by the number of bytes.

2. The method of claim 1, wherein:
    the request pertaining to the partition is a write request from the guest operating system to write a partition table; and
    detecting the indication further comprises:
        detecting, from the partition table, the starting location of the partition; and
        based on the detected starting location, determining whether the partition is misaligned.

3. The method of claim 1, wherein shifting the partition further comprises:
    shifting the partition to align the starting location of the partition to a block boundary of a file system used by the computer system.

4. The method of claim 1, wherein shifting the partition further comprises:
    shifting the partition to align the starting location of the partition to a sector boundary of a disk used by the computer system.

5. The method of claim 1, further comprising:
    writing zeros to initial bytes of a disk space allocated to the guest operating system, wherein the number of the initial bytes is equal to the number of bytes that the partition is shifted.

6. The method of claim 1, wherein the guest operating system uses a sector size of 512 bytes, the method further comprising:
shifting the starting location of the partition by 512 bytes in the data storage of the computer system.

7. The method of claim 2, further comprising:
shifting, by the hypervisor, the partition to a location different from the detected starting location, the different location being transparent to the guest operating system.

8. A system comprising:
data storage that comprises a disk; and
a computer system coupled to the data storage, the computer system hosts a hypervisor and a guest operating system, wherein the hypervisor is:
to receive a request pertaining to a partition from the guest operating system,
in response to an indication that the partition of the guest operating system is misaligned with storage boundary in the data storage, to shift the partition by a number of bytes to align a starting location of the partition to the storage boundary, and
to shift locations of subsequent data access requests of the guest operating system by the number of bytes.

9. The system of claim 8, wherein the computer system further comprises:
a storage manager in the hypervisor to detect, from a partition table, the starting location of the partition, and based on the detected starting location, to determine whether the partition is misaligned.

10. The system of claim 8, wherein the disk comprises:
a disk space allocated to the guest operating system, the disk space comprising zeros in initial bytes, wherein the number of the initial bytes is equal to the number of bytes that the partition is shifted.

11. The system of claim 8, wherein the storage boundary is a block boundary of a file system used by the computer system, the file system having a block size of a power of 2 and greater than a sector size used by the guest operating system.

12. The system of claim 8, wherein the storage boundary is a sector boundary of the disk, the disk having a sector size of a power of 2 bytes and greater than a sector size used by the guest operating system.

13. The system of claim 9, wherein the computer system further comprises:
a storage manager in the hypervisor, the storage manager to shift the partition to a location different from the detected starting location, wherein the different location is transparent to the guest operating system.

14. A non-transitory computer readable storage medium including instructions that, when executed by a processing system, cause the processing system to perform a method comprising:
receiving, by a hypervisor of the processing system, a request pertaining to a partition from a guest operating system;
detecting, by the hypervisor, an indication of misalignment between the partition and a storage boundary in data storage of the computer system, the partition used by the guest operating system;
in response to the indication, shifting, by the hypervisor, the partition by a number of bytes to align a starting location of the partition to the storage boundary of the computer system; and
shifting, by the hypervisor, locations of subsequent data access requests of the guest operating system by the number of bytes.

15. The computer readable storage medium of claim 14, wherein:
the request pertaining to the partition is a write request from the guest operating system to write a partition table; and
detecting the indication further comprises:
detecting, from the partition table, the starting location of the partition; and
based on the detected starting location, determining whether the partition is misaligned.

16. The computer readable storage medium of claim 14, wherein shifting the partition further comprises:
shifting the partition to align the starting location of the partition to a block boundary of a file system used by the computer system.

17. The computer readable storage medium of claim 14, wherein shifting the partition further comprises:
shifting the partition to align the starting location of the partition to a sector boundary of a disk used by the computer system.

18. The computer readable storage medium of claim 14, further comprising:
writing zeros to initial bytes of a disk space allocated to the guest operating system, wherein the number of the initial bytes is equal to the number of bytes that the partition is shifted.

19. The computer readable storage medium of claim 14, wherein the guest operating system uses a sector size of 512 bytes, the method further comprising:
shifting the starting location of the partition by 512 bytes in the data storage of the computer system.

20. The computer readable storage medium of claim 15, further comprising:
shifting, by the hypervisor, the partition to a location different from the detected starting location, the different location being transparent to the guest operating system.

* * * * *